(12) United States Patent
Shoemaker, Jr.

(10) Patent No.: US 11,758,898 B1
(45) Date of Patent: Sep. 19, 2023

(54) VERMIN TRAP WITH MAGNETIC RELEASE

(71) Applicant: Stephen P. Shoemaker Trust, Manhattan Beach, CA (US)

(72) Inventor: Stephen P. Shoemaker, Jr., Redondo Beach, CA (US)

(73) Assignee: Stephen P. Shoemaker Trust, Manhattan Beach, CA (US)

( * ) Notice: Subject to any disclaimer, the term of this patent is extended or adjusted under 35 U.S.C. 154(b) by 0 days.

(21) Appl. No.: 18/093,804

(22) Filed: Jan. 5, 2023

(51) Int. Cl.
*A01M 23/04* (2006.01)
*A01M 23/10* (2006.01)
*F16B 1/00* (2006.01)

(52) U.S. Cl.
CPC ............ *A01M 23/04* (2013.01); *A01M 23/10* (2013.01); *F16B 2001/0035* (2013.01)

(58) Field of Classification Search
CPC ...... A01M 23/04; A01M 23/10; A01M 23/12; A01M 23/20; A01M 23/22; F16B 2001/003
USPC .................................................. 43/69, 71, 74
See application file for complete search history.

(56) References Cited

U.S. PATENT DOCUMENTS

| | | | | |
|---|---|---|---|---|
| 1,597,551 A * | 8/1926 | Stewart | ................. | A01M 23/00 119/60 |
| 2,706,361 A * | 4/1955 | Peterson | ............... | A01M 23/04 43/69 |
| 2,741,866 A * | 4/1956 | Shirley | ................. | A01M 23/04 43/69 |
| 4,748,766 A * | 6/1988 | Stimac | ................. | A01M 23/04 43/69 |
| 4,876,821 A * | 10/1989 | Benzie | ................. | A01M 23/04 43/69 |
| 5,528,852 A * | 6/1996 | Sarff | ..................... | A01M 23/10 43/64 |
| 8,186,098 B1 * | 5/2012 | Wilson | ................. | A01M 23/06 43/72 |
| 8,205,377 B1 * | 6/2012 | Wilson | ................. | A01M 23/04 43/69 |
| 9,961,892 B2 * | 5/2018 | Chism | ................... | A01M 23/10 |
| 10,278,378 B1 * | 5/2019 | Wallendorff | .......... | A01M 23/02 |
| 2006/0026893 A1 * | 2/2006 | Sears | .................... | A01M 23/04 43/69 |
| 2011/0047858 A1 * | 3/2011 | Wu | ....................... | A01M 23/04 43/69 |

FOREIGN PATENT DOCUMENTS

| | | | | |
|---|---|---|---|---|
| AU | 2013266008 A1 * | 12/2014 | ............ | A01M 19/00 |
| GB | 2410667 A * | 8/2005 | ............ | A01M 23/04 |
| WO | WO-0211535 A1 * | 2/2002 | ............ | A01M 23/04 |
| WO | WO-2010088717 A1 * | 8/2010 | ............ | A01M 23/04 |

* cited by examiner

*Primary Examiner* — Peter M Poon
*Assistant Examiner* — Danielle A Clerkley
(74) *Attorney, Agent, or Firm* — FULWIDER PATTON LLP

(57) ABSTRACT

A trap for collecting animals includes a bin and a frame mounted above the bin's open top. A panel is mounted to the frame and pivots with respect to the stationary frame via a connection to a hinge. The frame includes a bait compartment at a first end of the panel that lures an animal to climb the frame and traverse the panel to get to the bait. The panel is held level by a magnet when the panel is unweighted, but when an animal attempts to cross the panel the weight of the animal overcomes the bias of the magnet and the panel tips downward, delivering the animal into the bin.

1 Claim, 7 Drawing Sheets

US 11,758,898 B1

VERMIN TRAP WITH MAGNETIC RELEASE

BACKGROUND

It has been said that if you build a better mouse trap, the world will beat a path to your door. Maybe because of this, many have tried to improve on the traditional mouse trap device. The problem with many animal traps is are that they are messy, violent, and torture or mortally wound the animal and/or use poisons, and require contact and/or clean up after completing the task. Few people want to deal with extracting the corpse, disposing of it, and cleaning the eventual mess that occurs. What is needed is an animal trap that is clean, efficient, humane, poison-free, easy to assembly and use, and does not require contact with the animal after death. The present invention addresses each of these needs.

SUMMARY OF THE INVENTION

The present invention is a trap for use with vermin of various sizes and it can be scaled to capture smaller animals such as mice and rats, up to larger pests such as possums. The trap collects the animal in a bin that can be used to transport the animal safely to another area if desired, or it can be filled to drown the animal. The device uses the bin below a pivoting panel mounted above the bin. The panel is held level by a magnet to prevent the panel from prematurely tipping when the pest first steps on the panel. Only when the pest has reached the end of the panel near the bait does the weight of the animal overcome the magnet's attraction, cause the panel to tip downward and drop the animal into the bin. In a preferred embodiment, the magnet does not directly attach to the panel but rather the attractive force is applied across a small gap between the magnet and the panel. This gap prevents the panel/magnet attraction from sticking so firmly that the panel fails to tip in some cases. Alternately, the magnet can be chosen to keep the panel from tipping only in the absence of a small counterbalancing force. In another embodiment, the panel is replaced with a cylinder held level by a magnet, but drops when the mouse approaches the bait to cause the mouse to lose balance and fall into the bin. When the mouse attempts to cross the cylinder, the cylinder drops or spins to displace the mouse into the bin.

The trap works by enticing an animal onto the frame using a stash of bait at the first end of the panel or cylinder. The animal maneuvers along the frame to the panel or cylinder to get the bait. At some point, the weight of the animal and the position of the animal overcomes the bias of the magnet and the panel or cylinder tips downward suddenly, causing the animal to fall into the bin. The bin has steep sides to prevent the animal from climbing out, thereby trapping the animal indefinitely until released or disposed of. The panel or cylinder automatically returns to the horizontal position once the mouse falls into the bin, and the trap is ready to capture another pest. Depending on the depth of the bin, the trap can continue collecting vermin until the bin needs to be emptied. The animals can be disposed of humanely or set free as per the user's preference.

These and other features of the invention will best be understood with reference to the drawings and the detailed description of the invention set forth below.

DETAILED DESCRIPTION OF THE PREFERRED EMBODIMENTS

Figure 1:
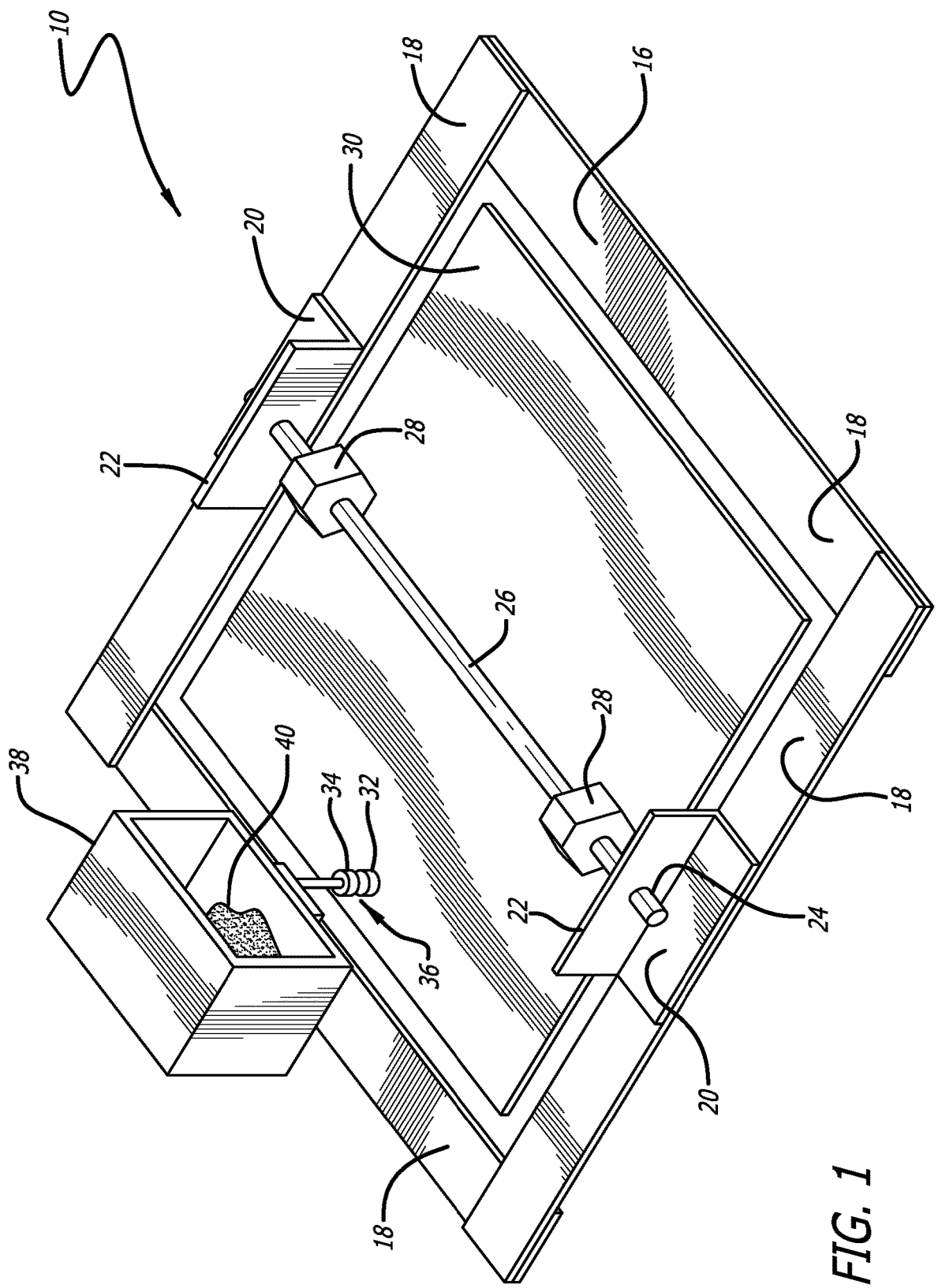
FIG. 1 is an elevated, perspective view of a first preferred embodiment of the present invention.

A first preferred embodiment of the present invention is shown in FIG. 1 and constitutes a trap 10 used to capture and collect various animals (mice, rats, etc.) of different sizes using a trap door type concept where animals seeking bait fall into a bin or receptacle for later disposal. The trap 10 includes a bin 12 such as a waste basket, trash can, barrel, or box that can be used to collect captured animals. The bin is hollow with an open top and includes steep vertical walls 14 so that animals cannot climb up the bin 12 from the inside. Over the open top is a frame 16 formed by four bars 18, although the number of bars can change depending on the dimensions of the bin 12. The frame 16 is rectangular in this example, although other shapes are possible, and forms a square or rectangle whose intersections lie on top of the bin's open top. The side flat bars each mount an "L" bracket 20 whose vertical portion 22 is formed with a hole 24. Spanning the frame 16 and journaled inside the holes 24 is a rod 26 that rotates freely inside the holes 24, where the location of the L brackets 20 locate the rod at the center of the frame and directly above the bin 12.

The rod 26 carries two blocks 28 that are fixed on the rod 20 so as to rotate therewith. The blocks 28 preferably have a shape with a flat bottom panel such as the hexagonal blocks shown in FIG. 1, although other shapes are possible. The lowermost flat surface of the blocks 28 are attached to a panel 30, where the panel rotates about the rod 26. Using a stop (not shown) on the frame or the L brackets 20, the rod can be configured only to rotate in one direction (namely that shown in FIG. 4) for reasons more fully understood below. Mounted on the panel 30 is a magnet 32 spaced from a second magnet 34 where the poles are such as to create a magnetic attraction between the two magnets, but the second magnet can be replaced with a steel washer or metal component. The magnetic attraction between the two magnets (or steel and magnet) across the gap 36 keeps the panel 30 horizontal and steady when there is no loading on the panel.

The frame sits above the bin 12, but can easily be moved from bin to bin and is not necessarily fixed onto the bin itself. Rather, it may sit on the bin and the shape of the frame allows for different size bins to be used with the same frame 16. At one end of the frame 16 is a bait compartment, such as a box 38 with an open side facing across the panel 30, where the box 38 is filled with a fragrant smelling bait 40 for attracting the animal. The line of sight from the frame 16 to the bait 40 is across the panel 30, luring the animal to panel 30 to reach the bait 40 in the bait compartment 38 (or bait located on the panel itself).

Figure 2:
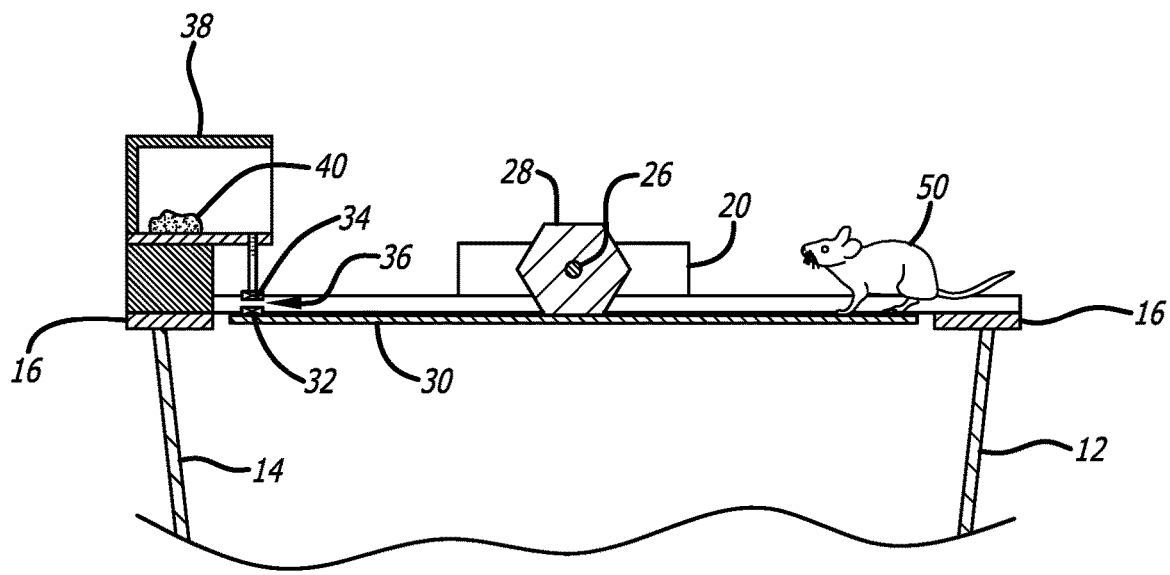
FIG. 2 is a side view, partially cut away, showing a mouse on the embodiment of FIG. 1.
Figure 3:
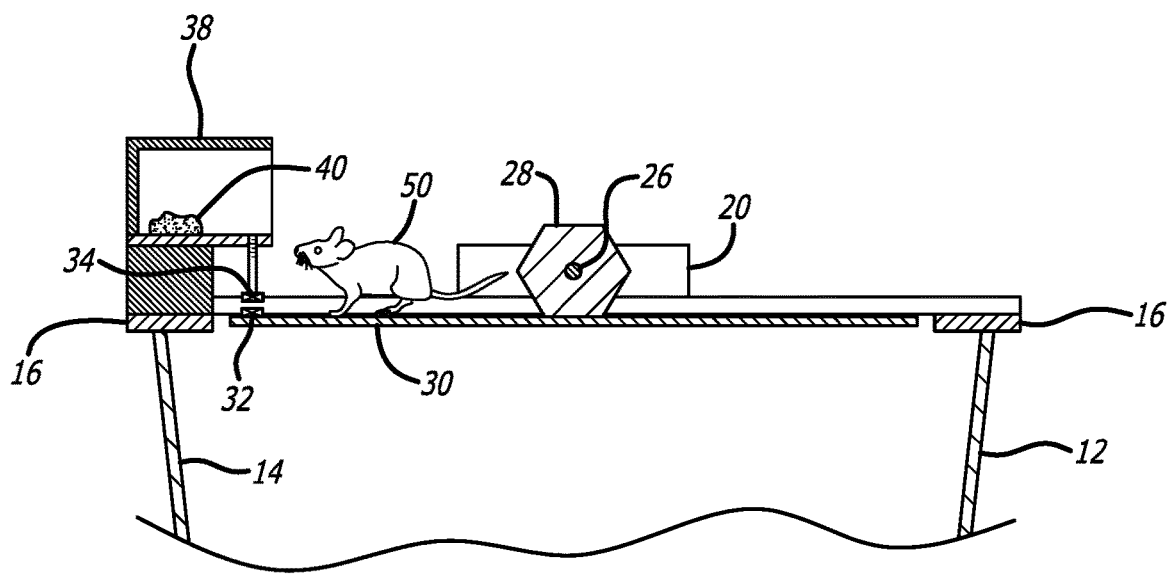
FIG. 3 is a side view, partially cut away, showing the mouse approaching the bait.
Figure 4:
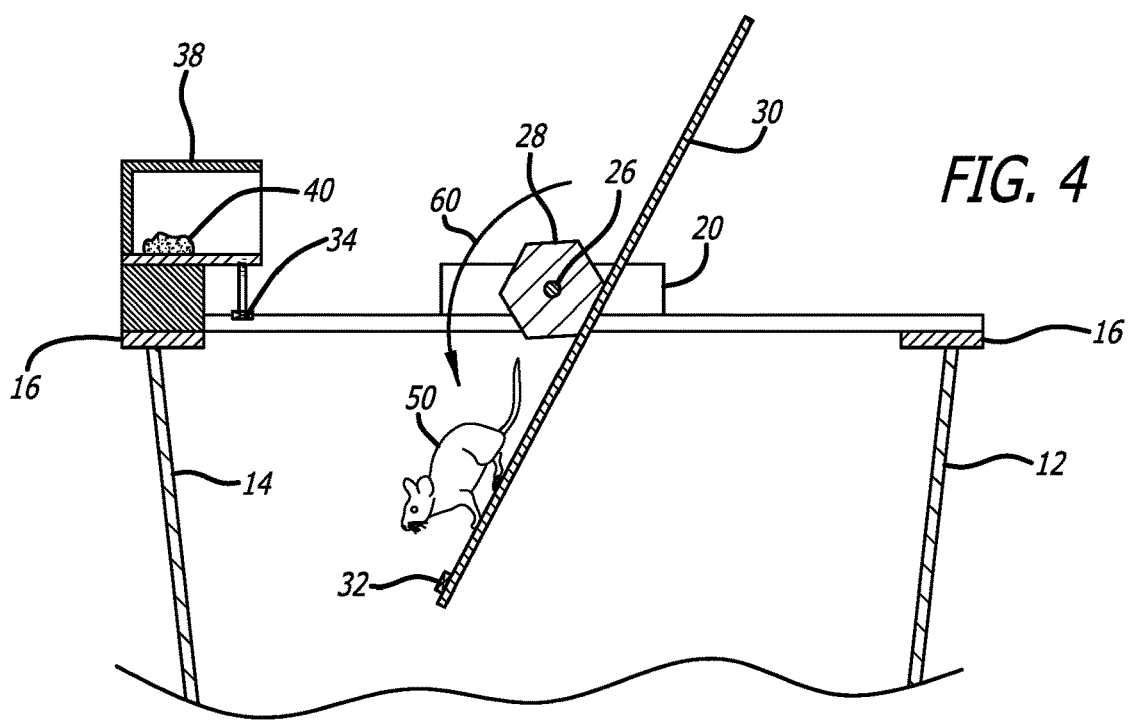
FIG. 4 is a side view, partially cut away, showing the panel tipping to drop the mouse into the bin.
Figure 5:
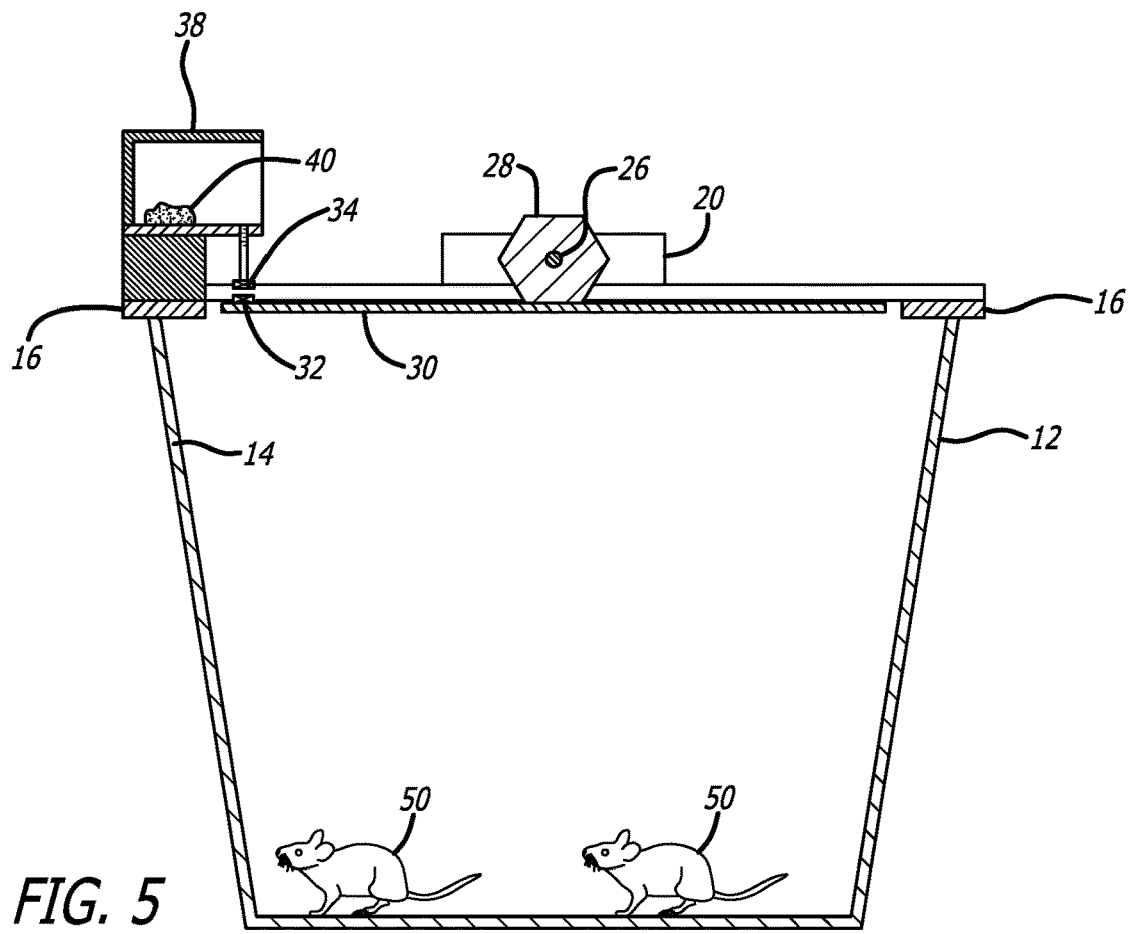
FIG. 5 is a side view, partially cut away, showing the panel restored to its original position by the magnet and the mouse inside the bin.
Figure 6:
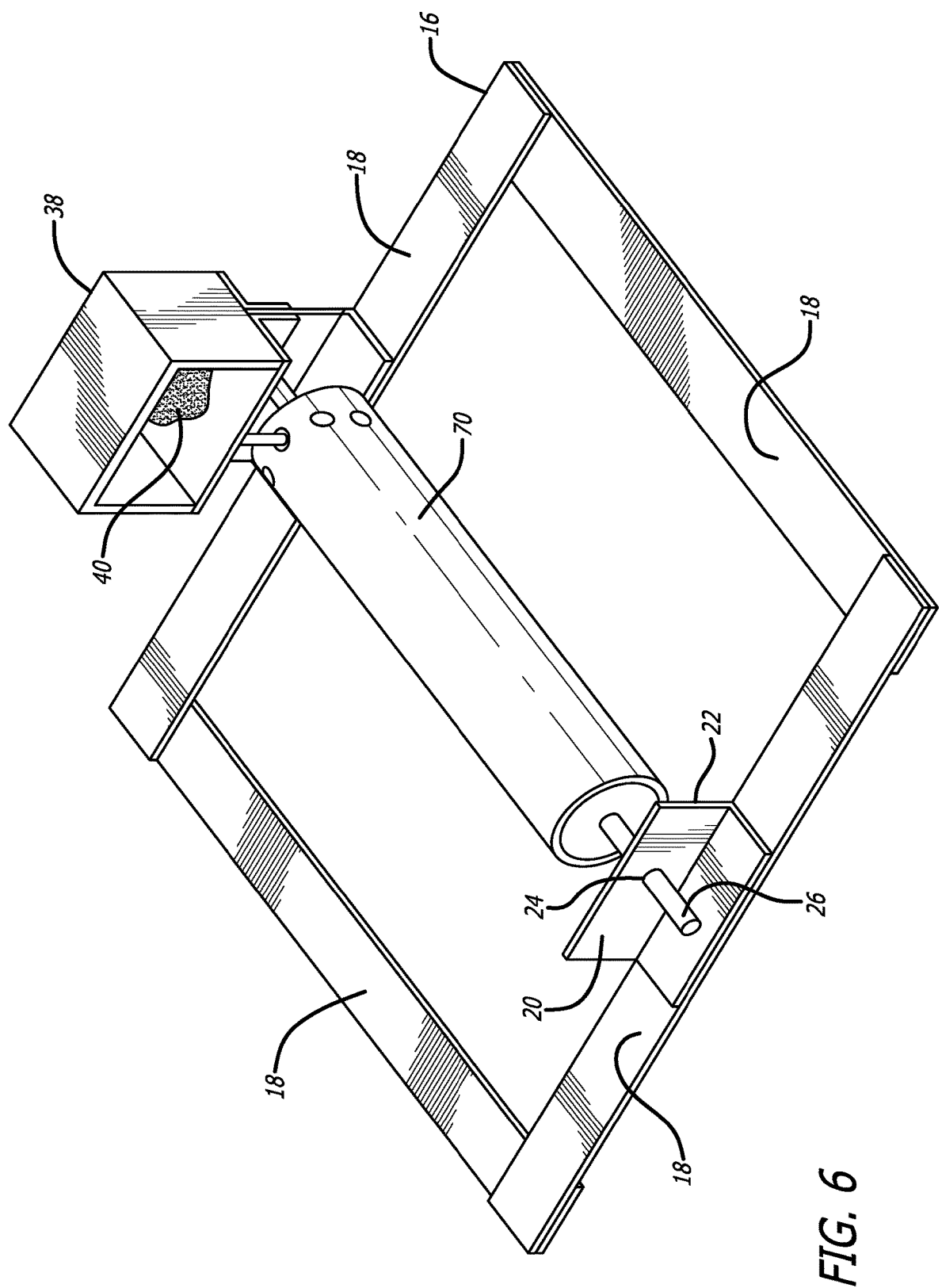
FIG. 6 is an elevated, perspective view of a second preferred embodiment of the present invention.

FIG. 2 illustrates the animal 50 reaching the frame 16 and stepping on the panel 30 so as to move to the bait 40. The two magnets 32, 34 keep the panel horizontal and steady using the attractive force across the gap 36 as the mouse moves across the panel 16. In a preferred embodiment, the rod 26 cannot rotate clockwise in FIG. 2 so that the panel is held firm as long as the mouse is to the right of the rod 26. In FIG. 3, the animal 50 has moved across the panel 16 and is approaching the bait box 38. The weight of the mouse is now working against the magnets' attractive forces keeping the panel horizontal, and the closer the mouse approaches the bait box the greater the force tending to tip the panel 16. In FIG. 4, the weight of the mouse and its position adjacent the edge of the panel 16 cause the attractive force of the magnets' to be overcome, and the rod 26 rotates counter-clockwise in the direction of arrow 60. This causes the panel to tip suddenly as shown in FIG. 4. The animal 50 cannot retreat because of the slope and preferably slick surface of the panel and slides down the panel to the bottom of the bin 12 (FIG. 5). With the animal no longer tilting the panel 16, the weighted end of the panel counter rotates until the magnets acquire their attraction and return the panel 16 to its horizontal position. The trap 10 is now ready to capture another animal. The trapped animal 50 cannot scale the bin 12 and remains trapped until released or otherwise disposed of.

Figure 7:
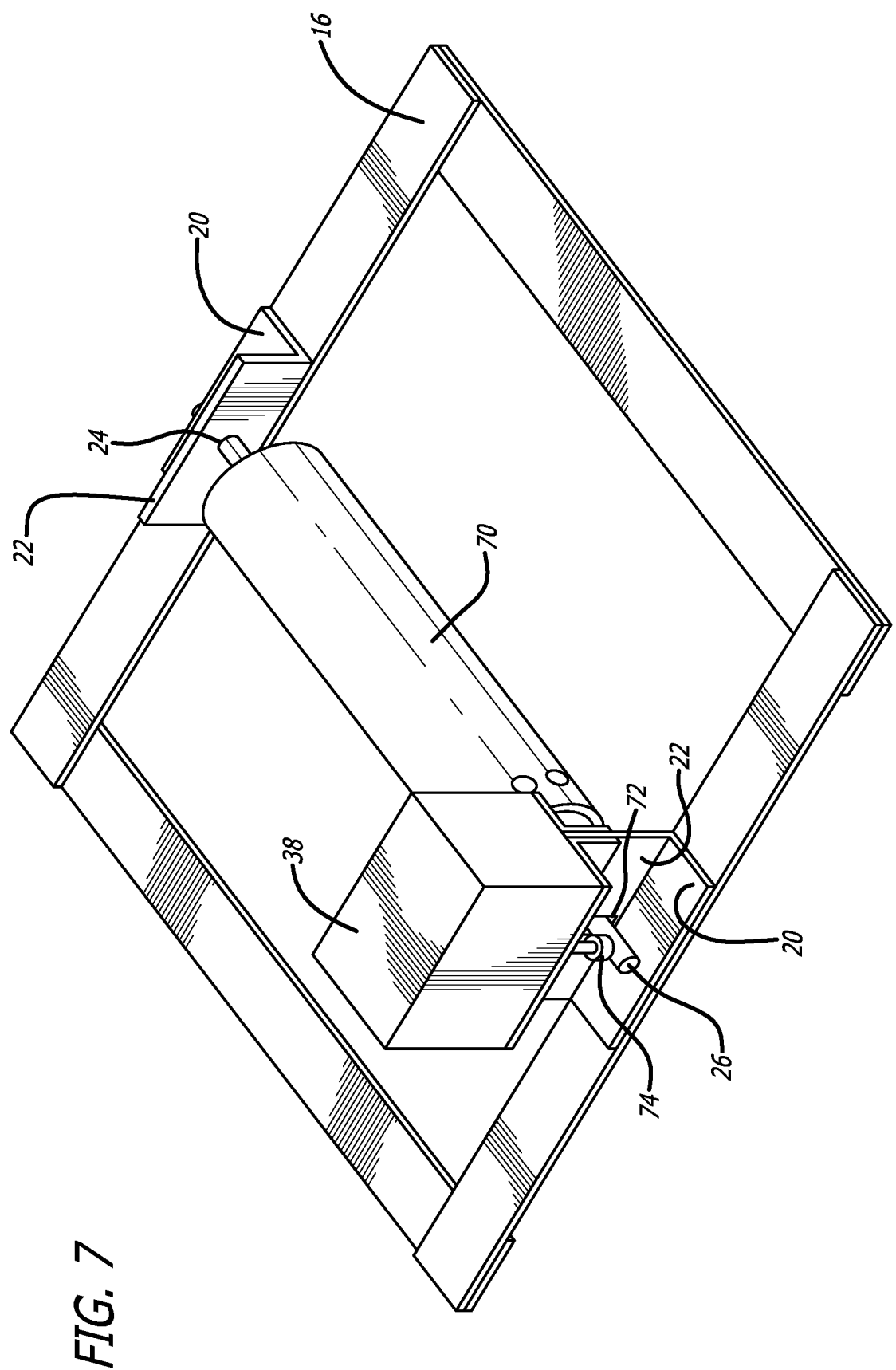
FIG. 7 is another elevated, perspective view of the embodiment of FIG. 6.
Figure 8:
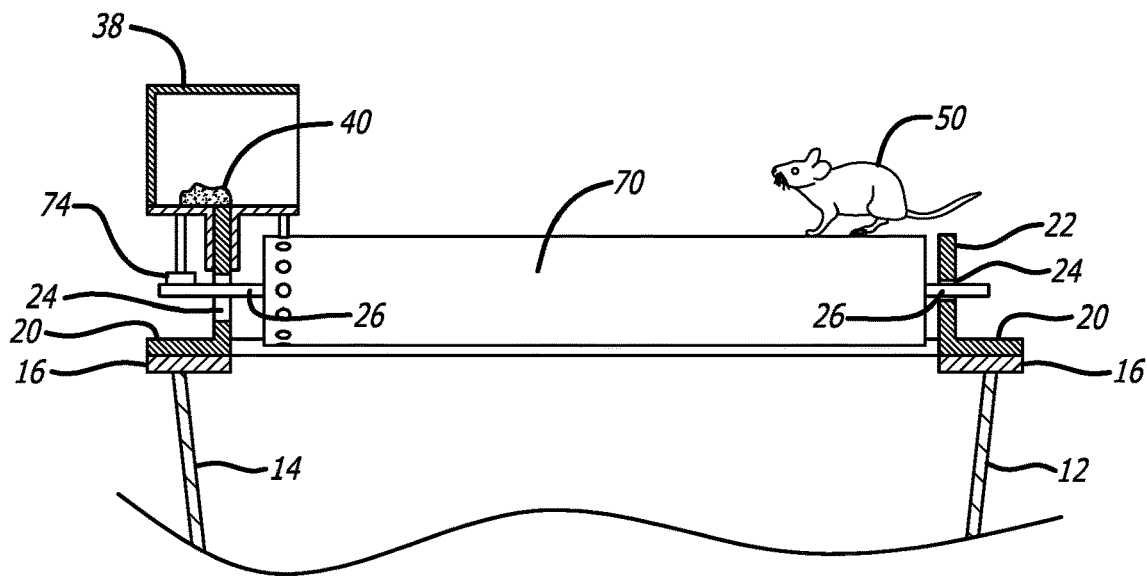
FIG. 8 is a side view, partially cut away, showing a mouse on the second embodiment.
Figure 9:
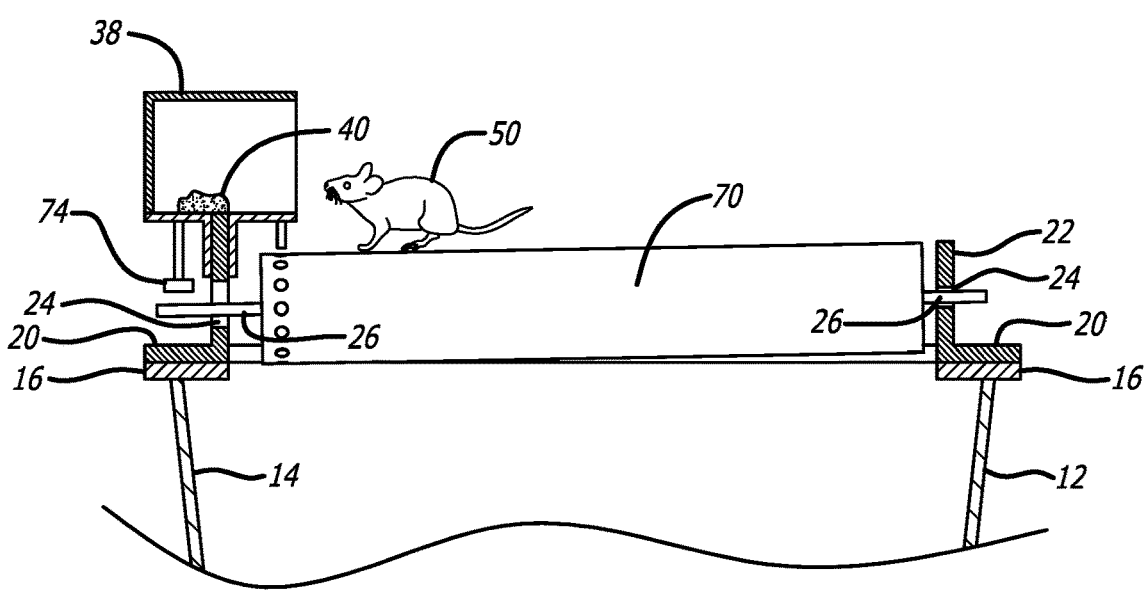
FIG. 9 is a side view, partially cut away, showing the mouse approaching the bait.
Figure 10:
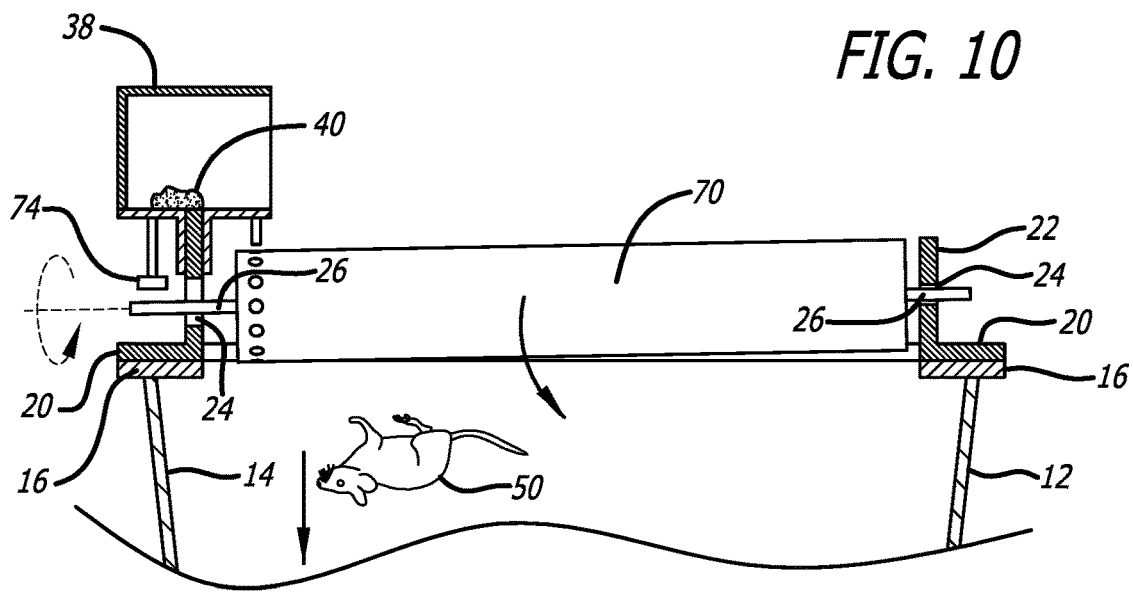
FIG. 10 is a side view, partially cut way, showing cylinder spinning and/or tipping to spill the mouse into the bin.
Figure 11:
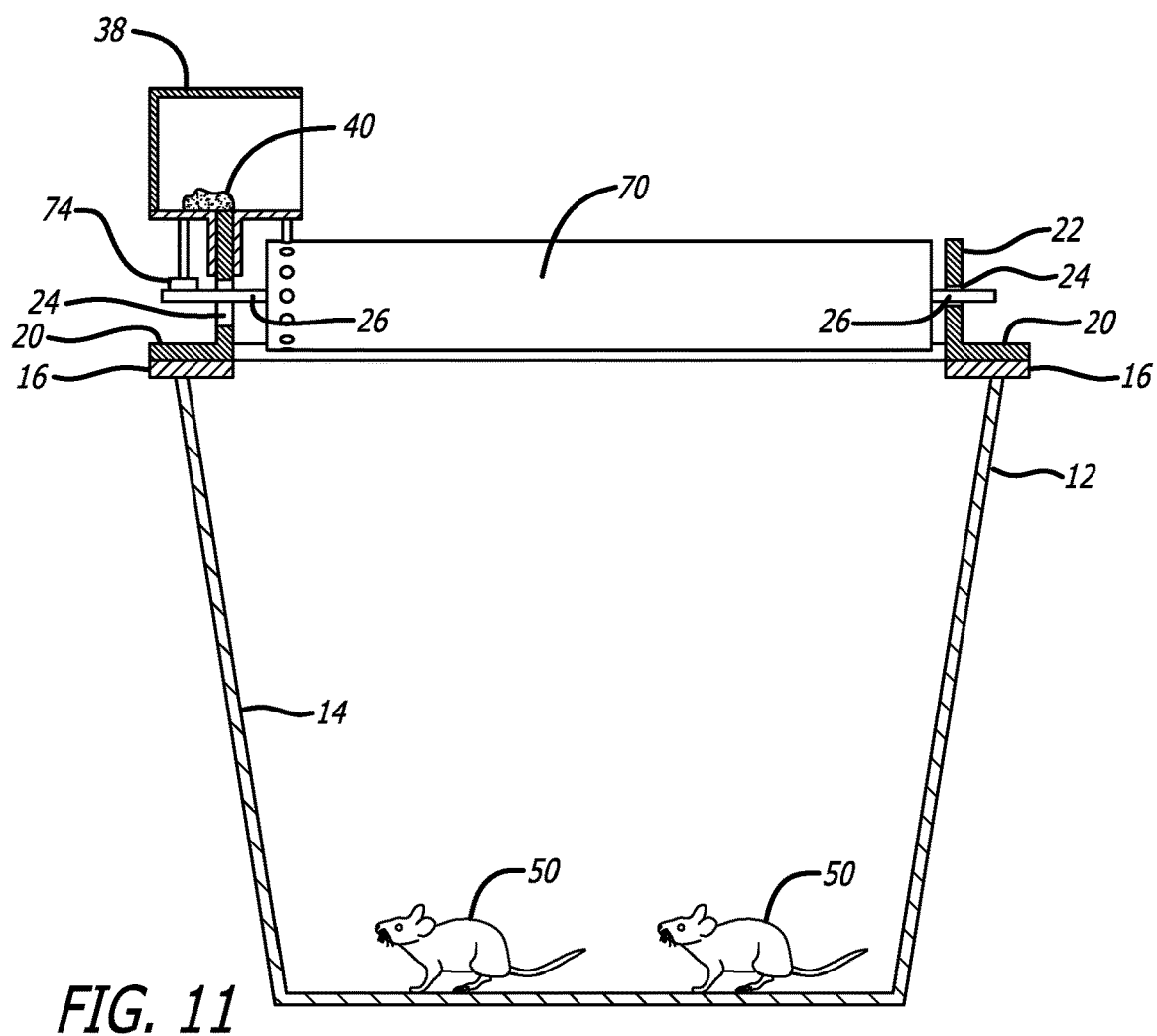
FIG. 11 is a side view, partially cut away, showing the cylinder restored to its original position by the magnet and the mouse inside the bin.

FIGS. 6-11 show a slightly altered embodiment of the invention where the panel 16 of the first embodiment is replaced with a cylinder 70 mounted on the rod 26. Here, like elements have retained their original numbering across the embodiments. The rod is held in an L bracket 20 at a first end and in a vertical slot 72 at a second end adjacent the bait box 38. This vertical slot 72 allows for the rod, and the cylinder 70, to have some vertical play where the cylinder can go from horizontal to tilted downward depending upon the position of the rod's end in the vertical slot 72. As shown in FIG. 7, the rod 26 may be held in place by a magnet 74 that keeps the cylinder level and keeps the cylinder from rotating. The magnetic attractive force of the magnet 74 and the rod 26 keep the cylinder steady. In FIG. 8, the mouse 50 steps on the cylinder to cross the bin and get to the bait 40. The magnet 74 is attached to the rod and prevents the cylinder from moving or spinning. In FIG. 9, the mouse has almost traversed the cylinder and reached the bait box 38, where its weight can overcome the magnet's attraction. In FIG. 10, the cylinder moves suddenly as the magnet releases the rod 26, causing the cylinder to drop and spin. The mouse 50 is dislodged from the cylinder 70 and drops into the bin 12. With the weight of the mouse no longer pushing the rod downward, the cylinder 70 returns to horizontal in FIG. 11 and is ready to capture another animal.

While the inventor's preferred embodiments have been disclosed, the invention is not limited to the specific examples depicted and described herein. Rather, the scope of the invention is properly measured using the plain and ordinary meaning of the words in the appended claims, consistent with but not limited by the foregoing discussion and drawings.

I claim:

1. A trap for collecting animals, comprising:
    a bin having a floor, an open top, and vertical walls;
    a frame mounted above the open top, the frame including flat members intersecting at multiple locations on the open top;
    a cylinder mounted to a rod spanning the frame at a central position and the cylinder configured for vertical pivoting about a first connection point and free rotation;
    a bait compartment disposed on the frame opposite the first connection point; and
    a first magnet mounted on the frame and attachable to the rod, the magnet attracting the rod to maintain the cylinder in a horizontal position in absence of an animal on the cylinder;
    wherein, when an animal is positioned on the cylinder adjacent the bait compartment, a weight of the animal overcomes an attractive force between the first magnet and rod, and the cylinder drops downward or spins to deliver the animal into the bin.

* * * * *